United States Patent
Fujiwara

(10) Patent No.: US 8,411,848 B2
(45) Date of Patent: Apr. 2, 2013

(54) TELEPHONE INTERFACE CIRCUIT FOR PROVIDING OVER-CURRENT AND OVER-VOLTAGE PROTECTION

(75) Inventor: Yoshinobu Fujiwara, Tokyo (JP)

(73) Assignee: Uniden Corporation, Tokyo (JP)

( * ) Notice: Subject to any disclaimer, the term of this patent is extended or adjusted under 35 U.S.C. 154(b) by 1154 days.

(21) Appl. No.: 12/268,895

(22) Filed: Nov. 11, 2008

(65) Prior Publication Data
US 2010/0119054 A1 May 13, 2010

(51) Int. Cl.
*H04M 1/00* (2006.01)
*H04M 9/00* (2006.01)

(52) U.S. Cl. .......... 379/412; 379/331; 361/119

(58) Field of Classification Search .......... 361/119
See application file for complete search history.

(56) References Cited

U.S. PATENT DOCUMENTS

| | | | |
|---|---|---|---|
| 3,544,808 A | 12/1970 | Mukai | |
| 4,475,012 A | 10/1984 | Coulmance | |
| 4,580,011 A | 4/1986 | Glaser | |
| 4,694,483 A | 9/1987 | Cheung | |
| 4,709,296 A | 11/1987 | Hung et al. | |
| 5,315,651 A | 5/1994 | Rahamim et al. | |
| 5,392,349 A | 2/1995 | Elder | |
| 5,796,767 A | 8/1998 | Aizawa | |
| 6,418,222 B2 | 7/2002 | Wong et al. | |
| 6,782,098 B1 | 8/2004 | Fujiwara | |
| 7,027,594 B2 | 4/2006 | Casey et al. | |
| 7,206,403 B2 | 4/2007 | Fujiwara | |
| 2004/0174986 A1* | 9/2004 | Holcombe et al. | 379/387.01 |
| 2004/0228060 A1 | 11/2004 | Fujiwara | |
| 2006/0250732 A1* | 11/2006 | Peachey | 361/56 |
| 2007/0025549 A1 | 2/2007 | Fujiwara | |
| 2007/0116256 A1* | 5/2007 | Ponganis et al. | 379/413 |
| 2008/0037772 A1 | 2/2008 | Fujiwara | |
| 2008/0037773 A1 | 2/2008 | Fujiwara | |
| 2008/0181391 A1 | 7/2008 | Fujiwara | |
| 2008/0285741 A1 | 11/2008 | Fujiwara | |
| 2011/0157754 A1* | 6/2011 | Nagai | 361/56 |

\* cited by examiner

*Primary Examiner* — Fan Tsang
*Assistant Examiner* — Jeffrey Lytle
(74) *Attorney, Agent, or Firm* — Hultquist, PLLC; Frank J. Bozzo; Steven J. Hultquist

(57) ABSTRACT

In a telephone interface circuit, a first NPN transistor switch-controls a connection between a speech circuit and a pair of subscriber lines. A second PNP transistor controls an on/off state of the first transistor. A positive feedback circuit connects a collector terminal of the first transistor to a base terminal of the second transistor. An internal power source supplies current for driving the second transistor. The first transistor operates in a saturated region when a voltage that is in a range of standard voltages delivered over a pair of subscriber lines for normal operating conditions of a subscriber line device that is not being subjected to an over-voltage or an over-current event is applied in between the pair of the subscriber lines. The first transistor operates in an unsaturated region when an overvoltage exceeding said range of standard voltages is applied in between the pair of the subscriber lines.

5 Claims, 3 Drawing Sheets

TELEPHONE INTERFACE CIRCUIT FOR PROVIDING OVER-CURRENT AND OVER-VOLTAGE PROTECTION

BACKGROUND OF THE INVENTION

1. Field of the Invention

The present invention relates to an interface circuit which is capable of protecting a telephone set from transient overvoltage such as surge voltage, and from continuous inflow of overcurrent due to a fault contact between a commercial power line and a pair of subscriber lines.

2. Description of the Related Art

Since the subscriber lines being air-suspended have the possibility of getting transient lightning-induced voltage propagation thereto due to a lightning strike, or receiving continuous inflow of overcurrent for a somewhat long period of time due to a fault contact (or short circuit in connection) with the commercial power line, a protection circuit is often provided in the interface between the telephone set and the subscriber line. As counter measures to possible lightning surges, for example, a structure with a varistor element connected between two subscriber lines, a structure with a varistor element connected between the subscriber line and the grounding wire, etc. are known. When a transient surge voltage exceeding a varistor voltage is applied to the subscriber line, the varistor element will function to protect a speech circuit inside the telephone set by shifting to a conduction mode to absorb the surge voltage.

Moreover, as a counter measure to possible heat generation and fires in the telephone set due to a fault contact between the commercial power line and the subscriber line, for example, a structure having a PTC (positive temperature coefficient) thermistor inserted to the interface between the subscriber line and the telephone set is known. When there is a continuous inflow of overcurrent at the PTC thermistor for a some period of time, an input impedance at the interface will increase along with a rise in the element temperature, whereby the inflow of overcurrent into the telephone set can be prevented.

FIG. 3 is a circuit diagram showing a conventional telephone interface circuit 30. The telephone interface circuit 30 is to perform interface control between a speech circuit 20, which is to process audio signals, and a pair of subscriber lines L1 and L2.

The telephone interface circuit 30 mainly includes a diode bridge 40 which serves to rectify signals traveling inside the pair of the subscriber lines L1 and L2 to supply the signals to the speech circuit 20, a transistor Tr3 which functions as a hook switch for switch-controlling the connection between the pair of the subscriber lines L1 and L2 and the speech circuit 20, a transistor Tr4 which functions as a driver for switch-controlling the on/off state of the transistor Tr3, and a zener diode D5 which serves to absorb possible overvoltage that could be applied to the subscriber lines L1 and L2.

The diode bridge 40 is composed of four diodes D1, D2, D3 and D4.

The transistor Tr3 is to turn on at an off-the-hook state so as to connect the pair of the subscriber lines L1 and L2 to the speech circuit 20, whereas it turns off at an on-the-hook state so as to disconnect the pair of the subscriber lines L1 and L2 from the speech circuit 20.

An emitter terminal E3 of the transistor Tr3 is connected to the subscriber line L1.

A collector terminal C3 of the transistor Tr3 is connected to the speech circuit 20 through a resistor R7.

A base terminal B3 of the transistor Tr3 is connected to a collector terminal C4 of the transistor Tr4 through a resistor R4.

A resistor R3 is connected between the emitter terminal E3 of the transistor Tr3 and the base terminal B3 of the transistor Tr3.

A base terminal B4 of the transistor Tr4 is divided into two lines, one connected to a terminal HC via a resistor R5 and the other connected to the subscriber line L2 via a resistor R6.

The transistor Tr3 is a PNP transistor whereas the transistor Tr4 is an NPN transistor.

The terminal HC is connected to a microcomputer (not shown). At the time when off-the-hook operation, on-the-hook operation, dial pulse transmitting operation or the like is to be carried out, this microcomputer serves to control a voltage V4 at the terminal HC in order to control a base potential of the transistor Tr4.

For instance, in the off-the-hook state, the microcomputer will control the voltage V4 at the terminal HC such that the voltage V4 will be at high voltage. Then the base potential of the transistor Tr4 will rise as an electric potential of the terminal HC rises, whereby the transistor Tr4 will turn on. Then, because a base potential of the transistor Tr3 will drop, the transistor Tr3 will turn on, and thus the pair of the subscriber lines L1 and L2 will be connected to the speech circuit 20.

In the off-the-hook state, in response to a dial input, the microcomputer will control the voltage V4 at the terminal HC. Thereby, the transistor Tr4 will transmit a dial pulse signal.

In the on-the-hook state, the microcomputer will control the voltage V4 at the terminal HC such that the voltage V4 will be at low voltage. Then the base potential of the transistor Tr4 will drop, whereby the transistor Tr4 will be cut off. Then, because the base potential of the transistor Tr3 will rise, the transistor Tr3 will be cut off, and thus the pair of the subscriber lines L1 and L2 will be disconnected from the speech circuit 20.

With respect to the above-described telephone interface circuit 30, however, transistors with high pressure resistance, which are quite expensive, are required to be used as the transistors Tr3 and Tr4 to be connected between the pair of the subscriber lines L1 and L2, and this leads to increase in manufacturing costs.

Moreover, as the above-described telephone interface circuit 30 has to have the resistor R4 inserted in between the two transistors Tr3 and Tr4, the telephone interface circuit 30 is left with little design flexibility.

SUMMARY OF THE INVENTION

Therefore, an object of the present invention is to provide a telephone interface circuit which can adopt transistors with low pressure resistance, which are inexpensive, as a first transistor that switch-controls a connection between a pair of subscriber lines and a speech circuit, and a second transistor that drive-controls the first transistor.

Furthermore, another object of the present invention is to provide a telephone interface circuit which does not require a resistor to be inserted in between the first and the second transistors, and which therefore is capable of having more design flexibility.

For the purpose of achieving the above-mentioned objects, a telephone interface circuit according to the present invention comprises: a first transistor which switch-controls a connection between a speech circuit and a pair of subscriber lines; a second transistor which controls an on/off state of the first transistor; a positive feedback circuit which connects a collector terminal of the first transistor to a base terminal of the second transistor; and an internal power source which supplies current for driving the second transistor. A circuit constant is set such that the first transistor is to operate in a saturated region when a voltage in a range of voltage for normal use is applied in between the pair of the subscriber lines, and such that the first transistor is to operate in an unsaturated region when an overvoltage exceeding the range of voltage for normal use is applied in between the pair of the subscriber lines.

Since the second transistor can operate by the current supplied by the internal power source, the second transistor does not need to have current supplied by the pair of the subscriber lines. Therefore, the first and the second transistors should be sufficient as long as they have pressure resistance based on the output voltage of the internal power source, and thus transistors with low pressure resistance which are available at low price can be used as the first and the second transistors.

Moreover, with respect to the telephone interface circuit according to the present invention, since it is not necessary to have a resistor to be inserted in between the first and the second transistors, the telephone interface circuit is allowed to have more design flexibility.

Furthermore, with respect to the telephone interface circuit according to the present invention, as the first transistor operates in the unsaturated region when an overvoltage is being applied to the pair of the subscriber lines, the first transistor, the second transistor and the positive feedback circuit will function as a self-propelled pulse generator. Accordingly, the first transistor and the second transistor will start oscillating while alternating between an on state and an off state, whereby the overcurrent flowing into the first transistor will be able to be cut off intermittently. In addition to that, it is possible to reduce the average value of overcurrent to a considerable extent, whereby the first transistor can be protected from the overcurrent.

The circuit constant is supposed to determine the base current of the second transistor. A boundary between the saturated region and the unsaturated region of the second transistor can be set based on the value of the base current.

DETAILED DESCRIPTION OF THE PREFERRED EMBODIMENTS

Figure 1:
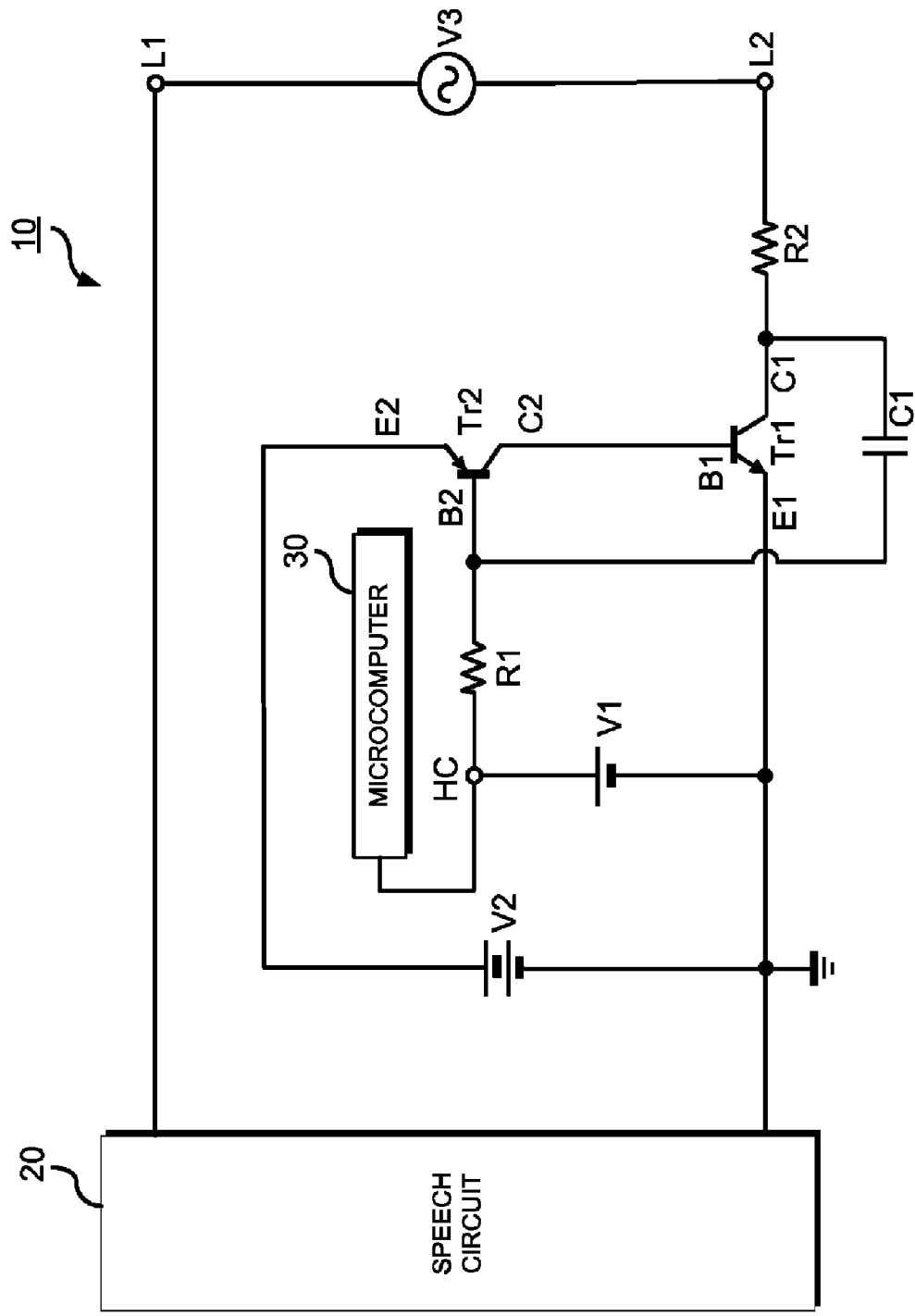
FIG. 1 is a circuit diagram illustrating a telephone interface circuit according to an embodiment of the present invention.

FIG. 1 is a diagram illustrating a circuit structure of a telephone interface circuit 10 according to an embodiment of the present invention.

The telephone interface circuit 10 is to perform interface control in between a speech circuit 20, which is to process audio signals, and a pair of subscriber lines L1 and L2. The telephone interface circuit 10 mainly includes a transistor Tr1 which functions as a hook switch for switch-controlling the connection between the pair of the subscriber lines L1 and L2 and the speech circuit 20, and a transistor Tr2 which functions as a driver for switch-controlling the on/off state of the transistor Tr1.

The transistor Tr1 is to turn on at an off-the-hook state so as to connect the pair of the subscriber lines L1 and L2 to the speech circuit 20, whereas it turns off at an on-the-hook state so as to disconnect the pair of the subscriber lines L1 and L2 from the speech circuit 20.

A collector terminal C1 of the transistor Tr1 is connected to the subscriber line L2 through a resistor R2, while an emitter terminal E1 of the transistor Tr1 is connected to the speech circuit 20 and a base terminal B1 of the transistor Tr1 is connected to a collector terminal C2 of the transistor Tr2. Moreover, the emitter terminal E1 of the transistor Tr1 is grounded.

A base terminal B2 of the transistor Tr2 is connected to a terminal HC through a resistor R1, while an emitter terminal E2 of the transistor Tr2 is connected to an internal power source V2. The internal power source V2 is a source of power that can be obtained, for instance, by converting an alternate-current power supplied by a commercial power source into a predetermined direct-current power using a power conversion module. The transistor Tr2 is to operate relying on the current supplied by the internal power source V2. The collector terminal C1 of the transistor Tr1 is also connected to the base terminal B2 of the transistor Tr2 through a capacitor C1.

The transistor Tr1 is an NPN transistor whereas the transistor Tr2 is a PNP transistor. It is noted that in FIG. 1, a zener diode which serves to absorb possible overvoltage that could be applied to the subscriber lines L1 and L2, and a diode bridge which serves to rectify signals traveling inside the subscriber lines L1 and L2 in order to supply the signals to the speech circuit 20 are being omitted.

The terminal HC is connected to a microcomputer 30. At the time when off-the-hook operation, on-the-hook operation, dial pulse transmitting operation or the like is to be carried out, this microcomputer 30 serves to conduct negative logic-based control on a voltage V1 at the terminal HC in order to control a base potential of the transistor Tr2.

For instance, in the off-the-hook state, the microcomputer 30 will control the voltage V1 at the terminal HC such that the voltage V1 will be at low voltage. Then the base potential of the transistor Tr2 will drop as an electric potential of the terminal HC drops, whereby the transistor Tr2 will turn on. Consequently, a collector current of the transistor Tr2 will start flowing. Since the collector current of the transistor Tr2 is equivalent to a base current of the transistor Tr1, the transistor Tr1 will turn on.

The lowered base potential of the transistor Tr2 will be positively fed back to the collector terminal C1 of the transistor Tr1 through the capacitor C1 that functions as a positive feedback circuit. In a case when a line voltage V3 in between the pair of the subscriber lines L1 and L2 stays within a range of voltage for normal use, the oscillation condition will not be met because a circuit constant, which is to determine the value of base current of the transistor Tr1, has been selected such that the transistor Tr1 will operate in a saturated region. Therefore, under the off-the-hook state, as long as the line voltage V3 in between the pair of the subscriber lines L1 and L2 is within the range of voltage for normal use, the transistor Tr1 will keep itself at the state of being turned on.

On the other hand, in a case when the line voltage V3 in between the pair of the subscriber lines L1 and L2 exceeds the range of voltage for normal use under the off-the-hook state, the oscillation condition will be met because a circuit constant, which is to determine the value of base current of the transistor Tr1, has been selected such that the transistor Tr1 will operate in an unsaturated region. As the oscillation condition is met, the transistors Tr1 and Tr2 as a pair will start oscillating according to the same oscillation principle as that of a multi-vibrator. Consequently, as a loop current flowing at the transistor Tr1 will be cut off intermittently, the transistor Tr1 will be able to be protected from the overcurrent.

In the off-the-hook state, in response to a dial input, the microcomputer 30 will control the voltage V1 at the terminal HC. Thereby, the transistor Tr2 will transmit a dial pulse signal.

In the on-the-hook state, the microcomputer 30 will control the voltage V1 at the terminal HC such that the voltage V1 will be at high voltage. Then the base potential of the transistor Tr2 will rise, whereby the transistor Tr2 will be cut off. Consequently, since the collector current of the transistor Tr2 will not flow, the transistor Tr1 will be cut off.

Next, a principle on the basis of which the transistors Tr1 and Tr2 are to oscillate when an overvoltage is being applied in between the pair of the subscriber lines L1 and L2 will be described.

As can be understood from the fact that a part of the base current of the transistor Tr2 is to be positively fed back to the collector terminal C1 of the transistor Tr1, as shown in FIG. 1, the transistors Tr1 and Tr2 as a pair are composing an in-phase amplifier circuit.

As mentioned above, when an overvoltage is applied in between the pair of the subscriber lines L1 and L2, transistors Tr1 and Tr2 as a pair will start oscillating according to the same oscillation principle as that of a multi-vibrator (or a self-propelled pulse generator), because the circuit constant has been selected such that the transistor Tr1 will operate in the unsaturated region. As the oscillation starts, the pair of the transistors Tr1 and Tr2 will alternate between an on state and an off state with a cycle period proportional to a time constant C1R1. For instance, when the transistor Tr2 is at an off state at a certain moment, the transistor Tr1 is also at an off state. At this moment, since the voltage V1 of the HC terminal has been set at low voltage, a first electrode, among first and second electrodes composing the capacitor C1, which is connected to the base terminal B2 of the transistor Tr2, will have its electric potential become lower than that of the second electrode, whereby the transistor Tr2 will shift to an on state in due course, while the transistor Tr1 will also shift to an on state. Due to charging and discharging by the capacitor C1, the pair of the transistor Tr1 and Tr2 will simultaneously alternate between an on state and an off state. A cycle period of alternation Tm is about "0.69×C1×R1".

Figure 2:
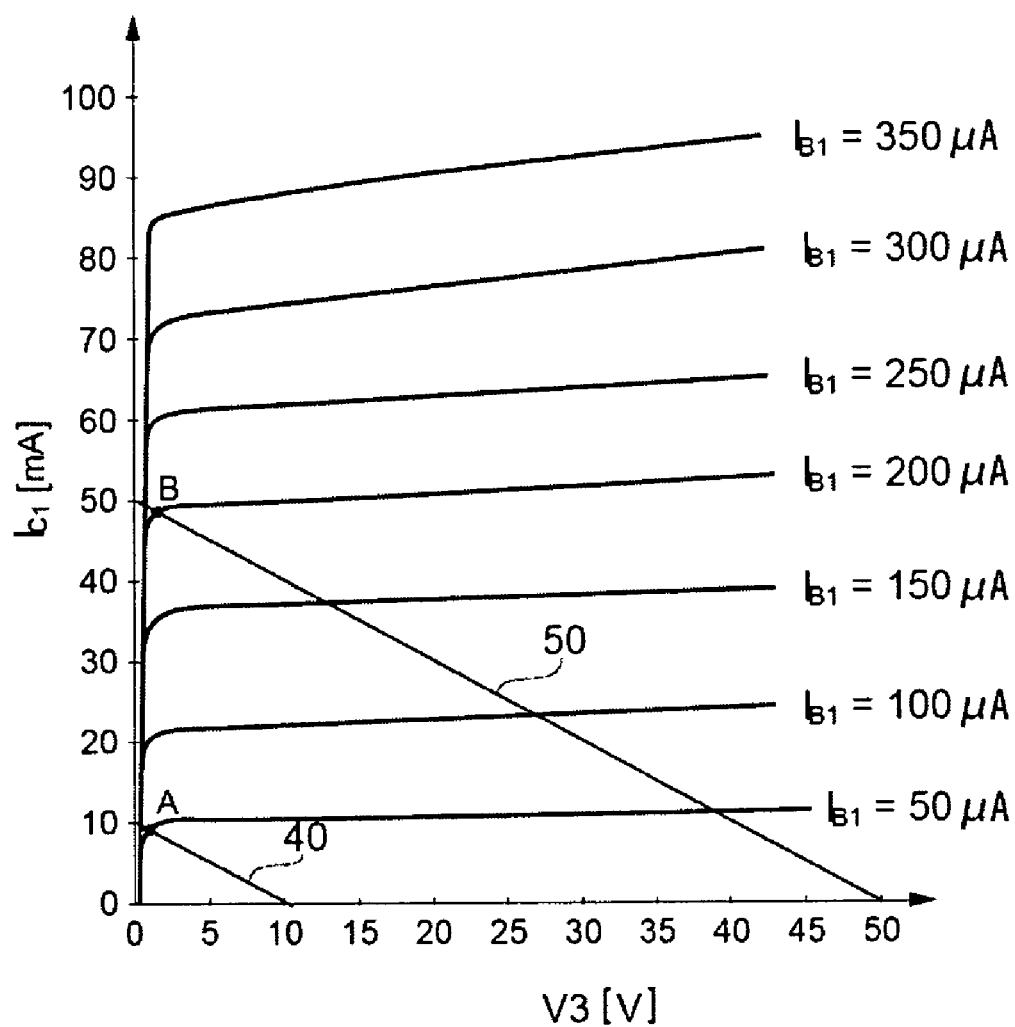
FIG. 2 is a graphic representation showing a static characteristic of a transistor.
Figure 3:
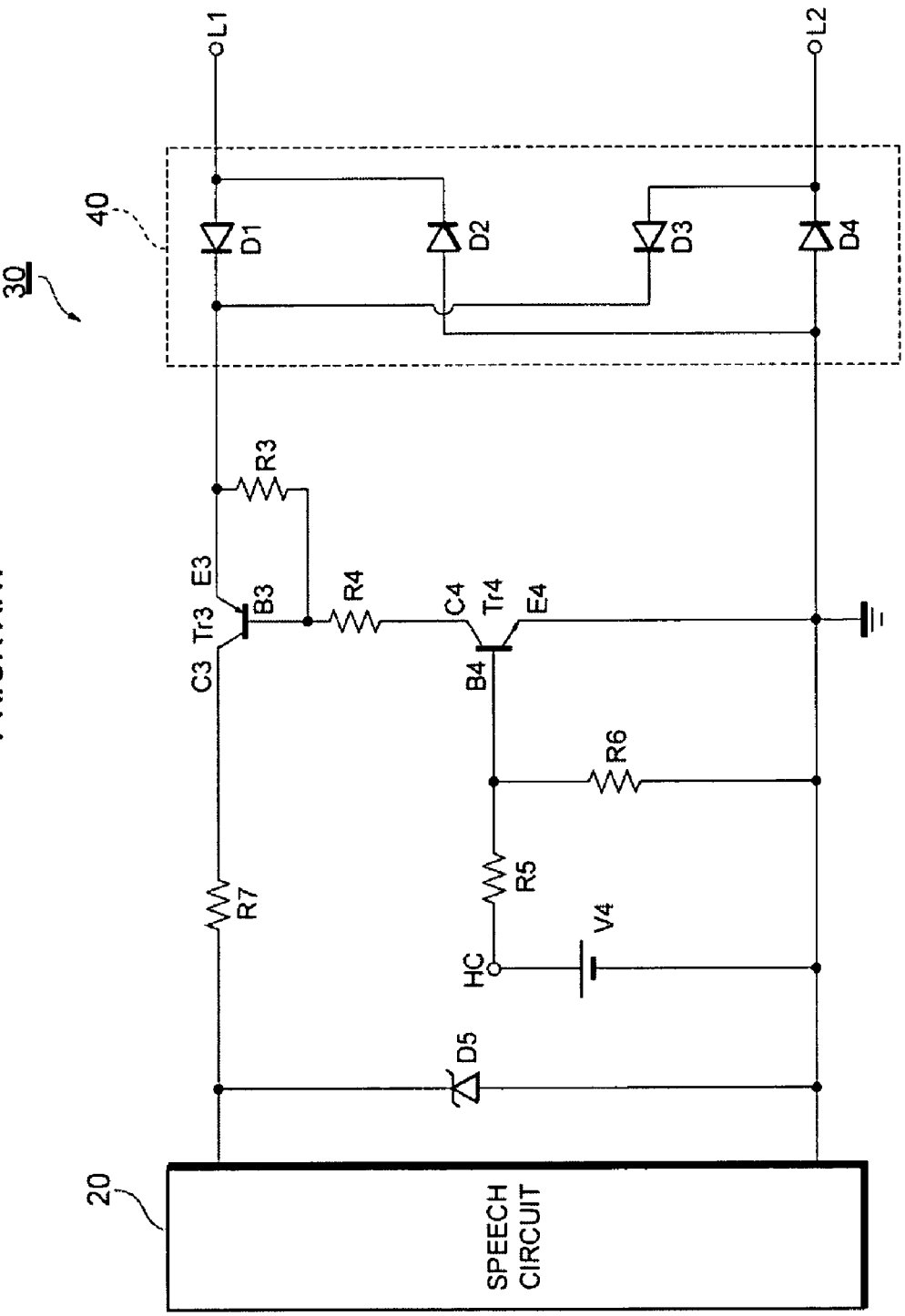
FIG. 3 is a circuit diagram illustrating a conventional telephone interface circuit.

FIG. 2 shows a static characteristic of the transistor Tr1.

A horizontal axis in a graph of FIG. 2 indicates a voltage difference between the collector and emitter of the transistor Tr1, that is, the line voltage V3, whereas a vertical axis indicates a collector current $I_{C1}$ of the transistor Tr1. Reference numeral 40 shows one example of load profile at the time when the line voltage V3 is within the range of voltage for normal use, while reference numeral 50 shows one example of load profile at the time when the line voltage V3 exceeds the range of voltage for normal use.

At this point, provided that a base current of the transistor Tr1 is indicated by $I_{B1}$, a collector current of the transistor Tr1 is indicted by $I_{C1}$, a direct current gain of the transistor Tr1 is indicate by $h_{FE1}$, a base current of the transistor Tr2 is indicated by $I_{B2}$, a collector current of the transistor Tr2 is indicted by $I_{C2}$, a direct current gain of the transistor Tr2 is indicate by $h_{FE2}$, and a voltage difference between the base and emitter of the transistor Tr1 and a voltage difference between the collector and emitter of the transistor Tr2 with respect to the line voltage V3 are disregarded, the following expressions can be derived.

$$I_{B2}=(V1-0.6)/R1 \quad (1)$$

$$I_{B1}=I_{C2}=I_{B2} \times h_{FE2} \quad (2)$$

$$I_{C1}=V3/R2 \quad (3)$$

$$I_{C1}=I_{B1} \times h_{FE1} \quad (4)$$

Based on expressions (1) to (4), the following expression can be derived.

$$V3=(V1-0.6) \times h_{FE1} \times h_{FE2} \times R2/R1 \quad (5)$$

From expression (5), it can be understood that a value of the voltage V3 at the time when the pair of the transistor Tr1 and Tr2 start oscillating (i.e. an oscillation start voltage) is inversely proportional to a resistance value of the resistor R1, and the oscillation start voltage can be adjusted arbitrarily with the resistance value of the resistor R1.

For example, when the line voltage V3 is 10 V (i.e. when the line voltage V3 is within the range of voltage for normal use), the transistor Tr1 will need a base current $I_{B1}$ of 50 μA in order to enter the saturated region, as indicated by a point A of intersection between a static characteristic curve of the transistor Tr1 and the load profile 40. According to the present embodiment, the circuit constant, which is to determine the value of the base current $I_{B1}$ of the transistor Tr1, has been selected such that the operating point of the transistor Tr1 will enter the saturated region when the line voltage V3 is within the range of voltage for normal use. Since the transistor Tr1 will not have an amplifying function in the saturated region, the oscillation condition will not be met even when a part of the base current of the transistor Tr2 is to be positively fed back to the collector terminal C1 of the transistor Tr1 through the capacitor C1.

Meanwhile, when the line voltage V3 is 50 V (i.e. when the line voltage V3 is an overvoltage that exceeds the range of voltage for normal use), the transistor Tr1 will need a base current $I_{B1}$ of 200 μA in order to enter the saturated region, as indicated by a point B of intersection between a static characteristic curve of the transistor Tr1 and the load profile 50. According to the present embodiment, the circuit constant, which is to determine the value of the base current $I_{B1}$ of the transistor Tr1, has been selected such that the operating point of the transistor Tr1 will enter the unsaturated region when the line voltage V3 is an overvoltage that exceeds the range of voltage for normal use. Since the transistor Tr1 will have an amplifying function in the unsaturated region, the oscillation condition will be met, whereby the pair of the transistors Tr1 and Tr2 will start oscillating.

Since such oscillation will start at the very instant when an overvoltage is applied in between the pair of the subscriber lines L1 and L2, an overcurrent passing through the transistor Tr1 will be cut off at the instant when the overvoltage is applied in between the pair of the subscriber lines L1 and L2. Although the overcurrent will start flowing into the transistor Tr1 again when the cycle period of alternation Tm elapses from the time the overcurrent has been cut off, the overcurrent will be cut off again at the very instant when the overcurrent starts flowing. In this way, the overcurrent flowing into the transistor Tr1 will be cut off intermittently. By adjusting the value of time constant C1R1 to an appropriate value, it is possible to set a ratio of the period, during which the overvoltage is being applied in between the pair of the subscriber lines L1 and L2, to the period, during which the overcurrent is flowing into the transistor Tr1 during the period when the overvoltage is being applied in between the pair of the subscriber lines L1 and L2, to about 10:1, for instance. Accordingly, it is possible to reduce the average value of overcurrent of the transistor Tr1 to a considerable extent.

The oscillating behavior by the transistors Tr1 and Tr2 will continue during the time period when the overvoltage is being applied in between the pair of the subscriber lines L1 and L2 (i.e. during the time period when the oscillation condition is being met). After that, as the line voltage V3 becomes lower to fall into the range of voltage for normal use, the operating point of the transistor Tr1 will return to the saturated region again, whereby the oscillating behavior will stop, for the oscillating condition will no longer be met. In this way, since the protection function of the telephone interface circuit 10 for protecting the transistor Tr1 has a self-recovery function, it will become available for normal use at the very moment when the overvoltage is stopped being applied to the pair of the subscriber lines L1 and L2.

As for the circuit constant which is to determine the value of the base current $I_{B1}$ of the transistor Tr1, for example, the voltage V1 of the terminal HC, the resistance value of the resistor R1, etc. can be considered. However, the circuit constant is not to be limited to these examples.

With respect to the telephone interface circuit 10 according to the present embodiment of the invention, since the transistor Tr2 can operate by the current supplied by the internal power source V2, the transistor Tr2 does not need to have current supplied by the pair of the subscriber lines L1 and L2. Therefore, the transistor Tr2 should be sufficient as long as they have pressure resistance based on the output voltage of the internal power source V2, and thus transistors with low pressure resistance which are available at low price can be used as the transistor Tr2.

Furthermore, with respect to the telephone interface circuit 10 according to the present embodiment of the invention, since it is not necessary to have a resistor to be inserted in between the two transistors Tr1 and Tr2, the telephone interface circuit 10 is allowed to have more design flexibility.

In case of power outage, the telephone interface circuit 10 should not be connected to the pair of the subscriber lines L1 and L2. In the telephone interface circuit 10 according to the present embodiment of the invention, since the internal power source V2 is to have power supplied by the commercial power source, the output voltage of the internal power source V2 will become zero in the case of power outage. Therefore, the transistor Tr2 will not turn on in the case of power outage.

This means that it is guaranteed that the telephone interface circuit 10 will not be connected to the pair of the subscriber lines L1 and L2 in the case of power outage.

What is claimed is:

1. A telephone interface circuit, comprising:
   a first transistor which switch-controls a connection between a speech circuit and a pair of subscriber lines, wherein the first transistor is an NPN transistor;
   a second transistor which controls an on/off state of the first transistor, wherein the second transistor is a PNP transistor;
   a positive feedback circuit which connects a collector terminal of the first transistor to a base terminal of the second transistor; and
   an internal power source which supplies current for driving the second transistor,
   a circuit constant being set such that the first transistor is to operate in a saturated region when a voltage in a range of standard voltages delivered over a pair of subscriber lines for normal operating conditions of a subscriber line device that is not being subjected to an over-voltage or an over-current event is applied in between the pair of the subscriber lines and such that the first transistor is to operate in an unsaturated region when an overvoltage exceeding said range of standard voltages is applied in between the pair of the subscriber lines.

2. The telephone interface circuit according to claim 1, wherein the circuit constant is to determine a base current of the first transistor.

3. The telephone interface circuit according to claim 1, wherein the first transistor and the second transistor are to oscillate while alternating between an on state and an off state when the overvoltage is applied in between the pair of the subscriber lines.

4. The telephone interface circuit according to claim 1, wherein the internal power source is a source of power that can be obtained by converting an alternate-current power supplied by a commercial power source into a direct-current power.

5. The telephone interface circuit according to claim 1, further comprising:
   a microcomputer which drive-controls the second transistor, wherein
   the microcomputer is to conduct negative logic-based control on the second transistor.

\* \* \* \* \*